United States Patent [19]
Takahashi et al.

[11] Patent Number: 5,659,618
[45] Date of Patent: Aug. 19, 1997

[54] MULTI-SIZE CRYPTOGRAPHIC KEY SYSTEM

[75] Inventors: Richard Jun Takahashi; Neil Edward Shea, both of Phoenix, Ariz.

[73] Assignee: VLSI Technology, Inc., San Jose, Calif.

[21] Appl. No.: 536,835

[22] Filed: Sep. 29, 1995

[51] Int. Cl.$^6$ .................................................. H04K 1/00
[52] U.S. Cl. ....................................... 380/49; 380/23
[58] Field of Search ................................. 380/20, 49, 23, 380/5, 28, 29, 30

[56] References Cited

U.S. PATENT DOCUMENTS

| | | | |
|---|---|---|---|
| 5,497,420 | 3/1996 | Garneau et al. | 380/20 |
| 5,504,816 | 4/1996 | Hamilton et al. | 380/20 |
| 5,504,933 | 4/1996 | Saito | 380/20 |
| 5,509,077 | 4/1996 | Moehrmann | 380/20 |

*Primary Examiner*—David C. Cain
*Attorney, Agent, or Firm*—Lavalle D. Ptak

[57] ABSTRACT

A system is employed for providing two different levels of protection for cryptographic devices transmitting digital information. The system is independent of the cryptographic algorithm used and works with any keyed cryptographic algorithm. High grade encryption is used for data transmitted from the transmitter device and employs an encryption key of "Y" bits. This information is decrypted at the receiver by a decryption circuit also having a "Y" key size. At the receiver, return information is encrypted by an encryption key having "X" bits, where $X=Y-Z$, with Z being a variable. The low grade information encrypted at the receiver is supplied back to the transmitter, which incorporates a decryption circuit having an "X" key size for decrypting the lower grade information.

12 Claims, 1 Drawing Sheet

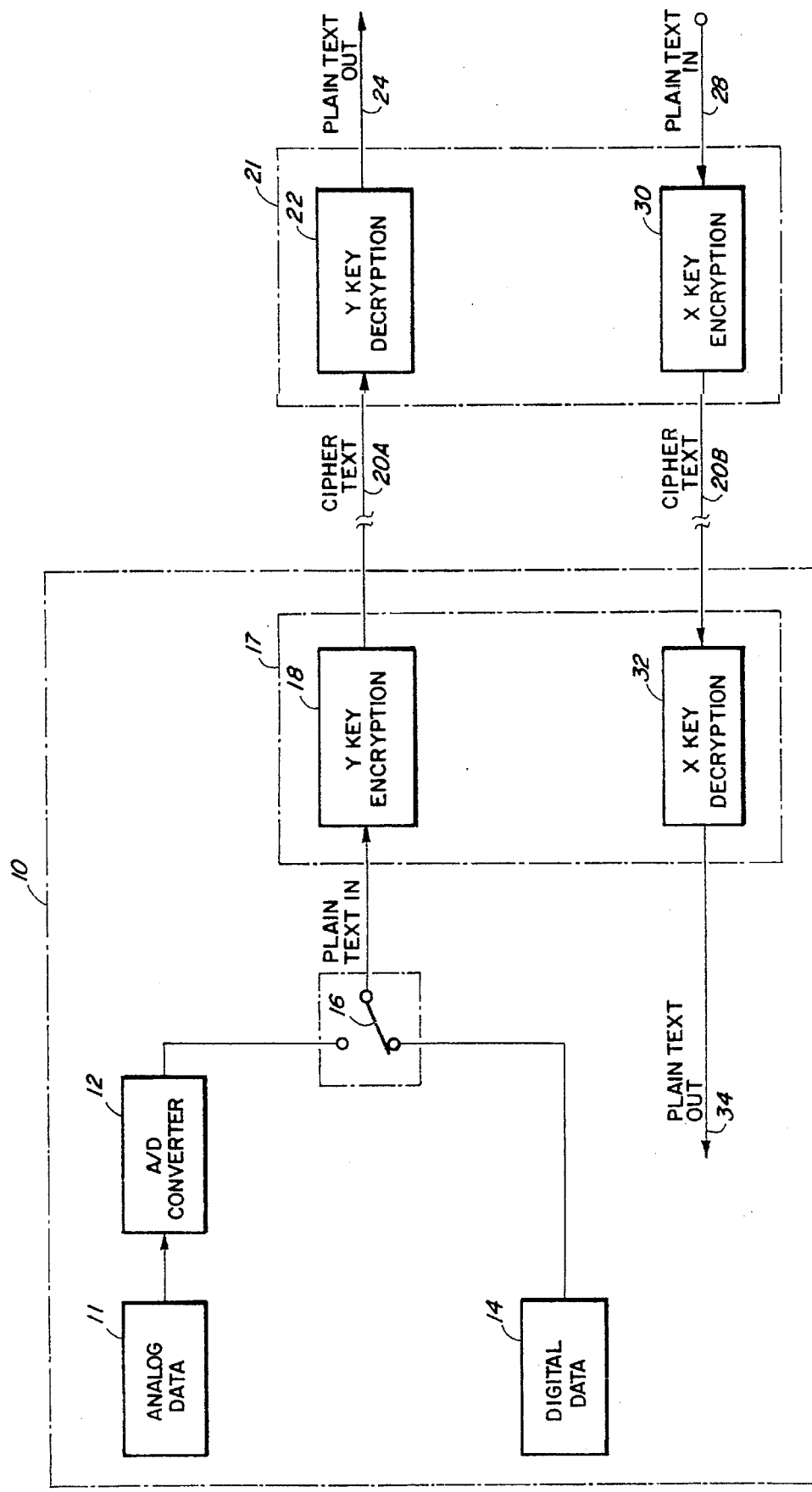

MULTI-SIZE CRYPTOGRAPHIC KEY SYSTEM

BACKGROUND

With the increasing use of computer networks for transferring data from one location to another remote location, a need has arisen for securing such data from unauthorized interception and reception. To provide such security, various cryptographic algorithms have been developed; and a transmitter then encrypts the data to be sent to the remote receiver by the use of such an algorithm. A decryption device utilizing the same algorithm is used at the receiver to decrypt the information to present it back in plain text, which then may be handled in any conventional manner at the receiver location.

The cryptographic algorithms and the number of bits used in an encryption key vary from low grade encryption, which is relatively easy to "break" or penetrate to high grade encryption, which typically employs larger keys (employing a greater number of bits), which are much more difficult to "break". Currently, valuable commercial property such as motion pictures, cable television signals, software, copyrighted music, and the like, is encoded in digital format. By utilizing digital formats, the clarity of the original always is maintained; and there is no deterioration in quality, even though the digitalized information may be stored for a long period of time. In addition, when delivery of software, motion pictures, cable television or audio music property to a remote location is desired, all that is necessary is to transmit the digital data representative of this property from a transmitting location to a remote location, which may be anywhere in the world. Modern computers readily can receive and store such information; and transmission links capable of handling this data on a worldwide basis exist.

Properties, such as motion pictures, cable television programs, computer software and the like, are extremely valuable. Without high level encryption of such data when it is transmitted from one location to another, the valuable property being transmitted is subjected to the possibility of widespread piracy. Once such piracy occurs, the underlying value of the original property is greatly diminished, in some cases rendering it nearly valueless. As a result, it is extremely important that whenever such information is transferred by means of transmitting it over telephone lines or any other communications link (such as transmission to and from a satellite), the information is encrypted with a high grade encryption key to scramble the sensitive data. This is done so the protected information not only is unreadable by hackers intercepting the transmission, but further is protected so that even a sophisticated effort at cracking or "breaking" the encryption cannot be accomplished, or can only be accomplished with significant effort.

As valuable information is transmitted worldwide, an additional problem is encountered. Currently, United States government policy prohibits the exportation of "high grade" encryption keys out of the United States. A weaker encryption scheme is permitted to be exported from the United States; but this encryption employs a shorter key (currently 40 bits or less). It has been found that such low grade encryption keys (such as a 40 bit key) can be broken with reasonable effort on behalf a person intent on breaking the encryption code. Thus, the low grade, exportable encryption keys which currently exist are not suitable for protecting the extremely valuable property rights which exist in movies, games, video, software and the like.

Within the United States, for example in the cable television industry, typical cable servers send out games, video and software to customers using a larger high grade encryption key (a multi-bit key which typically is more than a 40-bit encryption scheme). The cable operator considers the encrypted information which is being sent as being privy only to the customer who purchases that particular service. The customer who requests information from the cable operator then is provided with a decryption key for decrypting the requested information. The customer then sends information back to the cable operator indicating that the information was received; and the necessary entitlement transaction is completed. This return information is not as important as the valuable information which originally is encrypted by the cable operator, and which is purchased by the customer. The same size key, however, can be used for transmission in both directions.

It is desirable to provide an encryption system which provides a high level of protection for the transmission of valuable data to a designated recipient, which may be used throughout the world to provide a high level or high grade encryption protection without breaching U.S. government regulations concerning the export of encryption systems.

SUMMARY OF THE INVENTION

It is an object of this invention to provide an improved encryption system.

It is another object of this invention to provide an improved keyed encryption system.

It is an additional object of this invention to provide an improved keyed encryption system using a larger key size for the encryption of data moving from a first data transmitter to a remote receiver and using a smaller size encryption key for the encryption of data moving from the remote receiver to the first data transmitter.

It is a further object of this invention to provide an encryption system which employs keyed cryptographic algorithms, in which the encryption key for data transmitted from a first location to a second location is encoded with a Y bit encryption key, and the encryption of data transmitted from the second location to the first location is encrypted with an X bit encryption key, which is smaller than the key Y.

In accordance with a preferred embodiment of the invention, an encryption system includes a transmitter device and a receiver device. The transmitter device has a transmit encryption circuit in it for supplying high grade encrypted information therefrom; and it has a decryption circuit in it for decrypting low grade encryption information received thereby. The receiver device has a decryption circuit in it for decryption of the high grade encrypted information supplied to it; and it has an encryption circuit in it for supplying low grade encrypted information from it to the transmitter device. A communication link couples the transmitter device and the receiver device for transferring the encrypted information between the devices.

BRIEF DESCRIPTION OF THE DRAWING

The sole figure of the drawing is a block diagram of a preferred embodiment of the invention.

DETAILED DESCRIPTION

Reference now should be made to the drawing, which is a block diagram of a preferred embodiment of the invention. As illustrated in FIG. 10, a transmitter device 10 is provided to send out information which needs to be protected, with the largest (most bits) encryption key size possible for the particular application with which the transmitter device 10 is used. The information which is encrypted is considered to be "high grade" information requiring a highest level of secrecy while it is being transferred over a communication link to a designated recipient.

In the transmitter device 10, data may be obtained from one or the other of two conventional sources, namely an analog data source 11 or a digital data source 14. Analog data 11 must be converted to digital data before encryption; and this is accomplished by an analog-to-digital converter 12. Information from the converter 12 and from the digital data source 14 then may be applied to a switch 16, which selects whichever source is being utilized at any given time, to provide plain text digital data to the transmitter encryption/decryption circuit 17. The source of the data which is provided through the switch 16 to the key circuit 17 may be any suitable source of digital information. Information which is supplied at the transmitter device 10 for transfer to a remote recipient or customer typically is in the form of motion pictures, video games, cable television programming, computer software, or the like. Such material typically is very valuable and must be protected against unauthorized reception during the transmission of such information from a source to an intended recipient.

To accomplish the encryption of the valuable plain text data which is obtained from the switch 16, an encryption key 18 is employed. As illustrated in the drawing, the key 18 employs an encryption key of "Y" bits which may operated with any desired type of keyed cryptographic algorithm. Typically, the larger the key size, the more secure is the encrypted data. For example, it has been found that a random number key of 56 bits constitutes a highly efficient and secure encryption "Y" bit key used in the encryption circuit 18 at the transmitter device 10. The manner in which the random number for the key "Y" of the encryption circuit 18 is generated may be accomplished in any suitable manner. It also should be noted that while 56 bits is considered a good length for the encryption key "Y" of the circuit 18, the key size may be any desired size, greater or smaller than this number, which is necessary to accomplish the level of encryption desired.

Cipher text or encrypted information from the transmitter device 10 is supplied over a suitable communications link, indicated at 20A in the drawing. This encrypted information then is supplied to a "Y" bit key decryption circuit 22 in a receiver device 21. The key decryption in the receiver device 21 employs the same number of bits "Y" which was used for the "Y" key encryption in the encryption circuit 18 to decode or decrypt the information. The plain text output then is provided at 24 for utilization at the location of the receiver device 21.

Typically, acknowledgement of receipt of the encrypted information is desired at the transmitter device 10. This is accomplished in the circuit shown in the drawing by supplying plain text acknowledgement information at the input terminal 28 to an "X" bit key encryption circuit 30 in the receiver device 21. This information then is encrypted by the encryption circuit 30 and is supplied as encrypted or cipher text over the communications link 20B to an "X" bit key decryption circuit 32 located in the encryption/decryption circuit 17 of the transmitter device 10.

The encryption key "X" is smaller (has fewer bits) than thus "Y" key, where $X=Y-Z$, where Z is a variable. For example, a typical "X" key encryption used in the encryption circuit 30 is 40 bits; so that in this example the variable "Z" equals 16.

It is readily apparent from an examination of the drawing and from the foregoing description that the encryption/decryption circuits 17 and 21 are not standard. Each of these circuits encrypts information at one level or grade and decrypts it at a different level or grade. For example, the encryption/decryption circuit 17 of the transmitter device 10 is designed to encrypt high grade information with a large (56 bit) encryption key "Y". The circuit 17, however, decrypts information which is low grade information encrypted with a much smaller (fewer number of bits) key "X" to produce the plain text output 34 at the transmitter device 10. Similarly, the encryption/decryption circuit 21 at the receiver device utilizes the "Y" key decryption for decoding or decrypting the high grade encrypted information supplied through the transmission link 20A; whereas the low grade plain text information at 28 is encrypted by a much smaller encryption key "X" at 30, as described above.

The operation of the system is such that information encrypted at either the transmitter device 10 or the receiver device 21 may be decrypted or decoded by the other, but that the receiver device is incapable of encrypting information with the high grade or long encryption key "Y" utilized in the transmitter device 10. An example for one of the reasons for this difference in encryption/decryption capabilities between the transmitter device 10 and the receiver device 21 may be used for the cable TV industry. As mentioned previously, typical cable servers send out games, video and software to customers encrypted by the larger (high grade) "Y" key through the encryption circuit 18. The cable operator considers this information to be privy only to the customers who purchase the particular service which is represented. To protect this information, the cable operator encrypts the data base with the largest key size possible, which in the above example is the "Y" key. The paying customer at the receiver device 21, requesting information from the cable operator, then uses the larger "Y" key to decrypt the information at 22. Next, the device at the customer location sends information from 28 back to the cable operator through the "X" bit encryption circuit 30, indicating the information was received; and the necessary entitlement transaction is completed.

The customer encrypts the data at 28 using the smaller key "X", since this information has a short lifetime of use. This is contrast to the long lifetime of use of the data base which is encrypted by the cable operator through the "Y" key encryption circuit 18. Typically, high grade information requires that the information to be protected for several years. Low grade information may be defined as information with a lifetime that is only valuable for weeks to months, at the most; and at the end of that time, the information no longer is useful. In general, important data is protected with the high grade key or larger key "Y"; and low grade or less important information is protected by a low grade or smaller key "X".

It further should be noted that for individuals or companies whose information originates from the United States (at the transmitter device 10), can transmit and encrypt that information using a large secure-sized key of "Y" length (such as the 56 bit length used in the example above) to a receiving device 21 for decryption, using the same "Y" length decryption key, even though the receiving device 21 may be located outside the United States. The smaller "X" key encrypts information sent back to the United States which is considered valuable, but only for a short period of time. No restrictions currently exist for the size of a decryption key, such as the decryption key 22 which may be exported from the United States. The restrictions imposed by the United States government are on the size of encryption keys. Currently, a 40 bit encryption key can be used for the "X" key for devices which are exported out of the United States. Thus, the system described above meets the requirements of the United States government concerning the limitations of the exportation of high grade or large encryption keys, while at the same time securely protecting information of a valuable nature transmitted from the United States to locations outside of the United States.

Ideally, the encryption/decryption circuits 17 and 21 are fabricated as part of a unitary integrated circuit, with the design of the receiving unit 21 preventing or making it difficult for anyone to alter the encryption device to increase the size of the encryption key "X".

The foregoing description of the preferred embodiment of the invention is to be considered as illustrative and not as limiting. Various changes and modifications will occur to those skilled in the art for performing substantially the same function, in substantially the way, to achieve substantially the same result, without departing from the scope of the invention as defined in the appended claims.

What is claimed is:

1. An encryption system including in combination:

a transmitter device having an encryption circuit therein with an encryption key of a first predetermined number of bits for encrypting high grade information supplied thereto to produce high grade encrypted information, and having a decryption circuit therein with a decryption key of a second predetermined number of bits less than said first predetermined number of bits for decrypting low grade encrypted information received thereby;

a receiver device having a decryption circuit therein with a decryption key of said first predetermined number of bits for decrypting high grade encrypted information supplied thereto, and having an encryption circuit therein with an encryption key of said second predetermined number of bits for encrypting low grade information supplied thereto to produce low grade encrypted information; and a communications link coupling said transmitter device and said receiver device for supplying said high grade encrypted information from said transmitter device to said receiver device for decryption by the decryption circuit therein and for supplying said low grade encrypted information from said receiver device to said transmitter device for decryption by the decryption circuit therein.

2. The combination according to claim 1 wherein said first predetermined number of bits is Y bits and said second predetermined number of bits is X bits, where X=Y–Z, and where Z is a whole number less than Y.

3. The combination according to claim 2 wherein the encryption circuit of said transmitter device and the decryption circuit of said transmitter device are constructed as a first single integrated circuit, and the encryption circuit of said receiver device and the decryption circuit for said receiver device are constructed as a second single integrated circuit.

4. The combination according to claim 3 wherein Y=56 bits and Z=16 bits.

5. The combination according to claim 4 further including a source of plain text supplied to the encryption circuit of said transmitter device for encryption thereby to supply said high grade encrypted information through said communications link to the decryption circuit of said receiver device; and a source of plain text supplied to the encryption circuit of said receiver device for encryption thereby to supply said low grade encrypted information through said communications link to the decryption circuit of said transmitter device.

6. The combination according to claim 1 wherein the encryption circuit for said transmitter device and the decryption circuit for said receiver device each have a key size of Y bits, and wherein the decryption circuit for said transmitter device and the encryption circuit for said receiver device each have a key size of X bits, where X=Y–Z, with Z being a variable number.

7. The combination according to claim 6 further including a source of plain text supplied to the encryption circuit of said transmitter device for encryption thereby to supply said high grade encrypted information through said communications link to the decryption circuit of said receiver device; and a source of plain text supplied to the encryption circuit of said receiver device for encryption thereby to supply said low grade encrypted information through said communications link to the decryption circuit of said transmitter device.

8. The combination according to claim 7 wherein Y=56 bits and Z=16 bits.

9. The combination according to claim 8 wherein the encryption circuit of said transmitter device and the decryption circuit of said transmitter device are constructed as a first single integrated circuit, and the encryption circuit of said receiver device and the decryption circuit for said receiver device are constructed as a second single integrated circuit.

10. The combination according to claim 1 further including a source of plain text supplied to the encryption circuit of said transmitter device for encryption thereby to supply said high grade encrypted information through said communications link to the decryption circuit of said receiver device; and a source of plain text supplied to the encryption circuit of said receiver device for encryption thereby to supply said low grade encrypted information through said communications link to the decryption circuit of said transmitter device.

11. The combination according to claim 1 wherein the encryption circuit of said transmitter device and the decryption circuit of said transmitter device are constructed as a first single integrated circuit, and the encryption circuit of said receiver device and the decryption circuit for said receiver device are constructed as a second single integrated circuit.

12. The combination according to claim 1 wherein both said high grade encrypted information and said low grade encrypted information employ different keyed cryptographic algorithms.

* * * * *